US011121589B2

(12) United States Patent
Yu et al.

(10) Patent No.: US 11,121,589 B2
(45) Date of Patent: Sep. 14, 2021

(54) SELF-ADAPTIVE MATCHING SYSTEM FOR MAGNETIC-RESONANCE WIRELESS CHARGING PROCESS

(71) Applicant: Chengdu Sprouting Technology Co., Ltd., Chengdu (CN)

(72) Inventors: Yiqiang Yu, Chengdu (CN); Pengfei Hu, Chengdu (CN)

(73) Assignee: CHENGDU SPROUTING TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/030,397

(22) Filed: Sep. 24, 2020

(65) Prior Publication Data

US 2021/0159738 A1 May 27, 2021

(30) Foreign Application Priority Data

Nov. 27, 2019 (CN) .......................... 201911185105.8

(51) Int. Cl.
*H02J 50/80* (2016.01)
*H02J 50/23* (2016.01)
*H02J 50/40* (2016.01)

(52) U.S. Cl.
CPC .............. *H02J 50/80* (2016.02); *H02J 50/23* (2016.02); *H02J 50/40* (2016.02)

(58) Field of Classification Search
CPC ............. H02J 50/80; H02J 50/23; H02J 50/40
See application file for complete search history.

(56) References Cited

U.S. PATENT DOCUMENTS

2020/0287413 A1* 9/2020 Peretz ..................... H02J 50/90

* cited by examiner

*Primary Examiner* — Robert L Deberadinis
(74) *Attorney, Agent, or Firm* — Bayramoglu Law Offices LLC

(57) ABSTRACT

A self-adaptive matching system for a magnetic-resonance wireless charging process includes a transmitting Bluetooth-communication and control circuit, a transmitting switching circuit, a regulator circuit, a transmitting antenna, a radio-frequency power amplifier circuit, a receiving Bluetooth-communication and control circuit, a receiving antenna, a receiving switching circuit and a rectifier and regulator circuit. The transmitting switching circuit, the regulator circuit and the transmitting antenna are connected to the transmitting Bluetooth-communication and control circuit, respectively. The radio-frequency power amplifier circuit is connected to the transmitting switching circuit and the regulator circuit, respectively. The regulator circuit is connected to the transmitting switching circuit. The receiving antenna, the receiving switching circuit and the rectifier and regulator circuit are connected to the receiving Bluetooth-communication and control circuit, respectively. The rectifier and regulator circuit is connected to the receiving switching circuit, and the receiving antenna is coupled with the transmitting antenna.

10 Claims, 10 Drawing Sheets

SELF-ADAPTIVE MATCHING SYSTEM FOR MAGNETIC-RESONANCE WIRELESS CHARGING PROCESS

CROSS REFERENCE TO THE RELATED APPLICATIONS

This application is based upon and claims priority to Chinese Patent Application No. 201911185105.8, filed on Nov. 27, 2019, the entire contents of which are incorporated herein by reference.

TECHNICAL FIELD

The present invention pertains to the field of wireless power transmission, and more particularly, relates to a self-adaptive matching system for a magnetic-resonance wireless charging process.

BACKGROUND

Traditional household appliances and electronic apparatus with built-in batteries are powered through a wired connection between a power line and a power socket. Electric utility lines and wires for supplying power to these electronic apparatus are ubiquitous. Such lines and wires not only occupy an activity space and limit the convenient use of the devices and apparatus, but also present safety hazards, some of which are hidden. Now, household appliances, consumer electronic products and mobile communication apparatus have been modernized with the evolution of electronic information and automation control technologies. Thus, with increased demand for a wireless-based portable device and a green energy grid system, research and application of a wireless energy transmission technology have rapidly become an area of focus in academic and industrial circles in China and throughout the world.

Currently, wireless charging technologies are mainly classified into three types. First is a quality index (QI) standard mainly popularized by the Wireless Power Consortium (WPC). It is also referred to as a magnetic induction coupling technology. The second type is a magnetic resonance coupling technology made popular by the Airfuel alliance. And the third type is an electromagnetic radiation-type wireless energy transmission technology. Compared with the magnetic induction technology, the magnetic resonance coupling technology has obvious advantages in charging distance, degrees of spatial freedom, one-to-many charging and power expansion. Meanwhile, the magnetic resonance coupling technology has a greater value when it comes to energy conversion efficiency, transmission power and electromagnetic safety than the electromagnetic radiation-type wireless energy transmission technology. The magnetic resonance coupling technology has found recent application in an intelligent wear device, a floor mopping robot, an automatic guided vehicle (AGV) and other apparatus. In these applications, the device includes a wireless charging function and so, the aforementioned concerns of safety and user experience enhancement are improved.

Moreover, magnetic resonance coupling technology in the field of smart homes is changing the manner in which traditional household appliances, mobile communication devices and consumer electronics are used. Using a residential building structure as an exemplary platform, all the power lines in a domestic living area can be completely removed by using magnetic resonance wireless charging, concealed wiring and automatic control technologies. At the same time, apparatus are charged or powered continuously without wire connection, thereby improving a home's safety, residential convenience and comfort. A high-efficiency, environmentally-friendly and energy-efficient living environment is achieved.

SUMMARY

To overcome the above-mentioned disadvantages in the prior art, the present invention provides a self-adaptive matching system for a magnetic-resonance wireless charging process, which solves problems of an overcoupling phenomenon caused by an excessively small distance and an undercoupling phenomenon caused by an excessively large distance, thereby improving transmission efficiency between the receiving and transmitting antennas.

To achieve the above objective, the present invention adopts the following technical solution.

A self-adaptive matching system for a magnetic-resonance wireless charging process includes a magnetic-resonance transmitting module and a magnetic-resonance receiving module connected to the magnetic-resonance transmitting module.

The magnetic-resonance transmitting module includes a transmitting Bluetooth-communication and control circuit, a transmitting switching circuit, a regulator circuit, a transmitting antenna and a radio-frequency power amplifier circuit. The transmitting switching circuit, the regulator circuit and transmitting antenna are connected to the transmitting Bluetooth-communication and control circuit, respectively. The radio-frequency power amplifier circuit is connected to the transmitting switching circuit and the regulator circuit, respectively. The regulator circuit is connected to the transmitting switching circuit, and the transmitting antenna is connected to the magnetic-resonance receiving module.

The magnetic-resonance receiving module includes a receiving Bluetooth-communication and control circuit, a receiving antenna, a receiving switching circuit and a rectifier and regulator circuit. The receiving antenna, the receiving switching circuit and the rectifier and regulator circuit are connected to the receiving Bluetooth-communication and control circuit, respectively. The rectifier and regulator circuit is connected to the receiving switching circuit, and the receiving antenna is connected to the transmitting antenna.

The present invention has the following advantages. A self-adaptive matching solution for magnetic-resonance wireless power transmission is adopted. Information between the receiving and transmitting antennas is collected by the Bluetooth-communication and control circuit, and a plurality of receiving antenna-transmitting antenna matching solutions are used and switched by a switch array circuit. The present invention solves the problem of a poor transmission efficiency between the receiving and transmitting antennas due to the overcoupling phenomenon caused by the excessively small distance and the undercoupling phenomenon caused by the excessively large distance in the magnetic-resonance wireless power transmission process, thereby greatly improving the transmission efficiency in case of different distances.

In the figures, 1—magnetic-resonance transmitting module, 2—magnetic-resonance receiving module, 3—transmitting Bluetooth-communication and control circuit, 4—transmitting switching circuit, 5—regulator circuit, 6—radio-frequency power amplifier circuit, 7—receiving Bluetooth-communication and control circuit, 8—receiving switching circuit, and 9—rectifier and regulator circuit.

DETAILED DESCRIPTION OF THE EMBODIMENTS

Embodiments of the present invention are described below to facilitate understanding of the present invention by those skilled in the art, but it should be understood that the present invention is not limited to the scope of the embodiments. Any change made without departing from the spirit and scope of the present invention as defined and determined by the appended claims is obvious to those skilled in the art, and any invention utilizing the inventive concept of the present invention shall fall within the scope of protection of the present invention.

Embodiment

Figure 1:
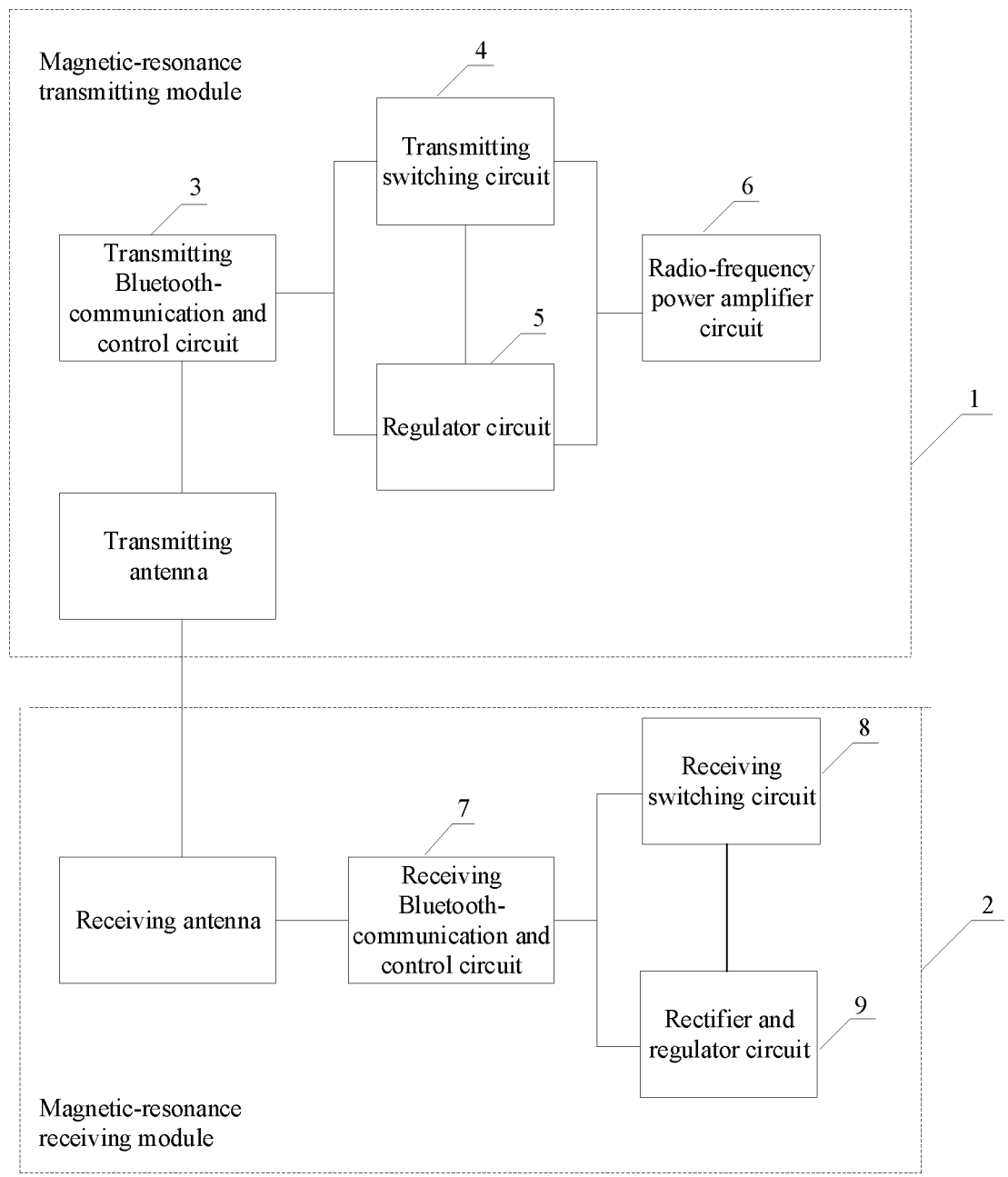
FIG. 1 is a schematic diagram showing a structure of a system according to the present invention.
Figure 2:
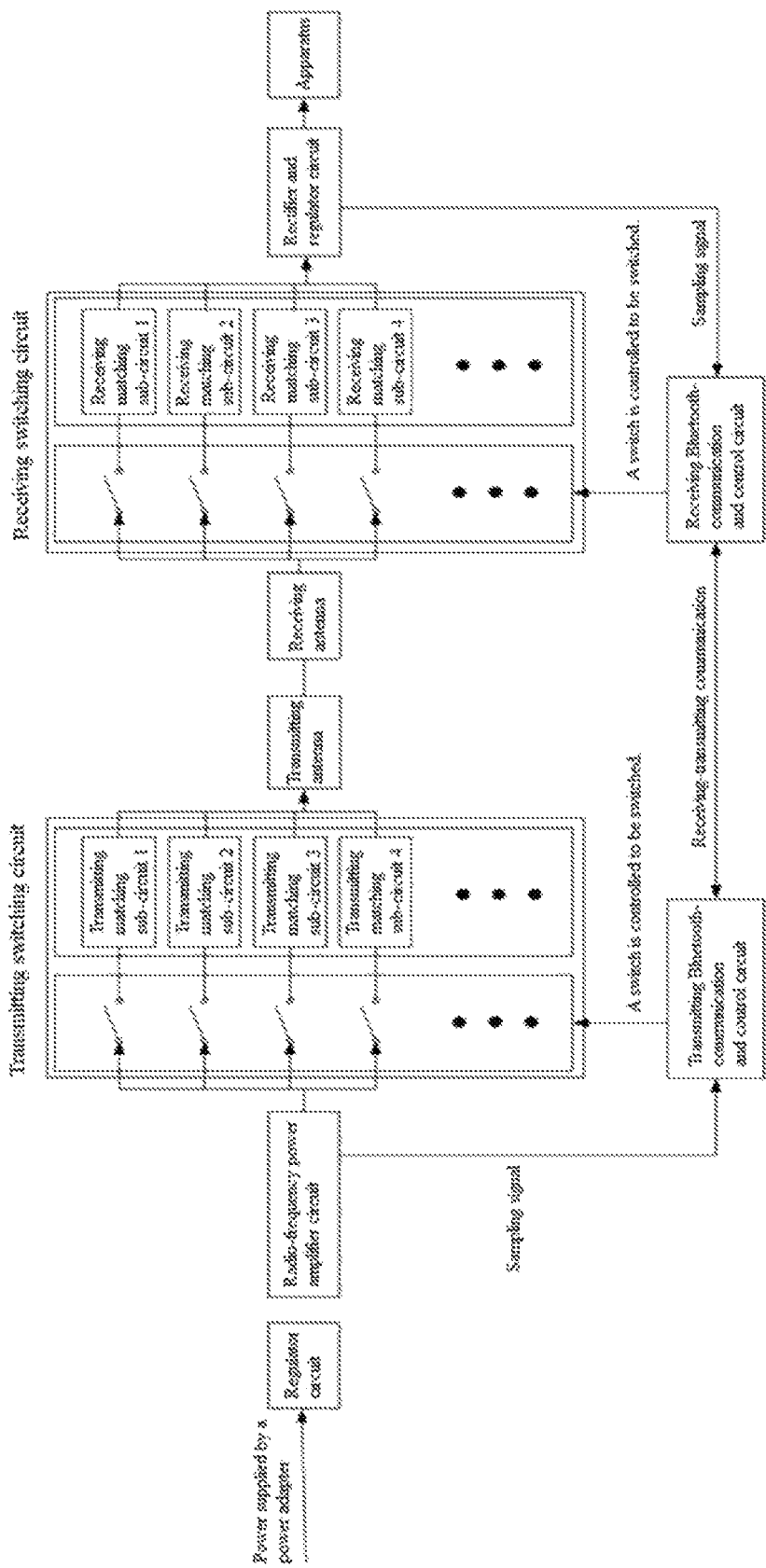
FIG. 2 is a schematic diagram showing the structure of the system according to the present invention.

The present invention provides a self-adaptive matching system for a magnetic-resonance wireless charging process. Information between the receiving and transmitting antennas is collected by receiving and transmitting Bluetooth-communication and control circuits, and a plurality of receiving antenna-transmitting antenna matching solutions are used and switched by a switch array circuit, so as to solve the problems of an overcoupling phenomenon caused by an excessively small distance and an undercoupling phenomenon caused by an excessively large distance, thereby improving a transmission efficiency between the receiving and transmitting antennas. As shown in FIGS. 1-2, the self-adaptive matching system includes the magnetic-resonance transmitting module 1 and the magnetic-resonance receiving module 2 connected to the magnetic-resonance transmitting module 1. The magnetic-resonance transmitting module 1 includes the transmitting Bluetooth-communication and control circuit 3, the transmitting switching circuit 4, the regulator circuit 5, the transmitting antenna and the radio-frequency power amplifier circuit 6. The transmitting switching circuit 4, the regulator circuit 5 and the transmitting antenna are connected to the transmitting Bluetooth-communication and control circuit 3, respectively. The radio-frequency power amplifier circuit 6 is connected to the transmitting switching circuit 4 and the regulator circuit 5, respectively. The regulator circuit 5 is connected to the transmitting switching circuit 4, and the transmitting antenna is connected to the magnetic-resonance receiving module 2. The magnetic-resonance receiving module 2 includes the receiving Bluetooth-communication and control circuit 7, the receiving antenna, the receiving switching circuit 8 and the rectifier and regulator circuit 9. The receiving antenna, the receiving switching circuit 8 and the rectifier and regulator circuit 9 are connected to the receiving Bluetooth-communication and control circuit 7, respectively. The rectifier and regulator circuit 9 is connected to the receiving switching circuit 8, and the receiving antenna is connected to the transmitting antenna.

A self-adaptive matching solution for magnetic-resonance wireless power transmission is adopted in the present invention; that is, information between the receiving and transmitting antennas is collected by the Bluetooth-communication and control circuit, and a plurality of receiving antenna-transmitting antenna matching solutions are used and switched by a switch array circuit. The present invention solves the problem of a poor transmission efficiency between the receiving and transmitting antennas due to the overcoupling phenomenon caused by the excessively small distance and the undercoupling phenomenon caused by the excessively large distance in the magnetic-resonance wireless power transmission process, thereby greatly improving the transmission efficiency in case of different distances.

Figure 3A:
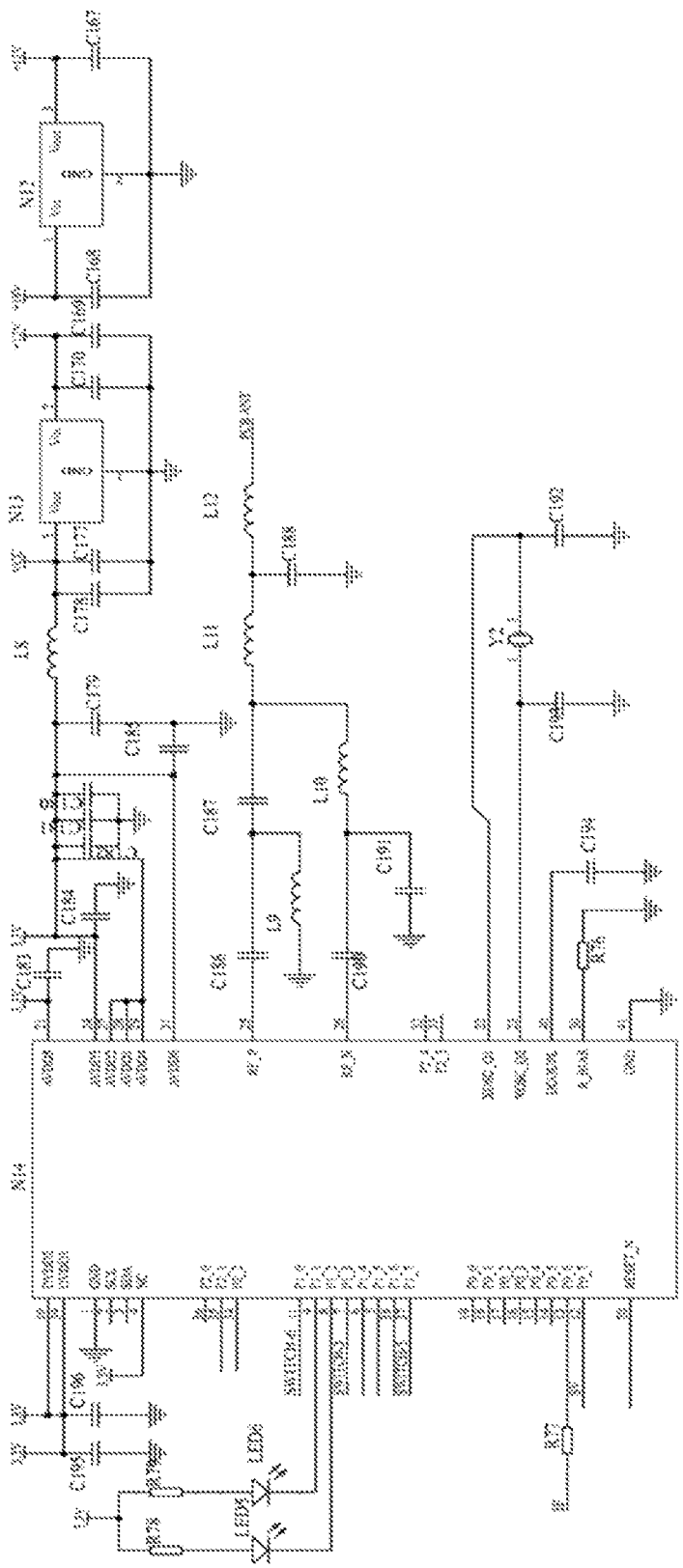
FIGS. 3A-3B are schematic diagrams showing a transmitting Bluetooth-communication and control circuit in the present invention, wherein, the pin P0_7 of the chip N14 in FIG. 3A is connected to one end of the resistor R75 in FIG. 3B.
Figure 3B:
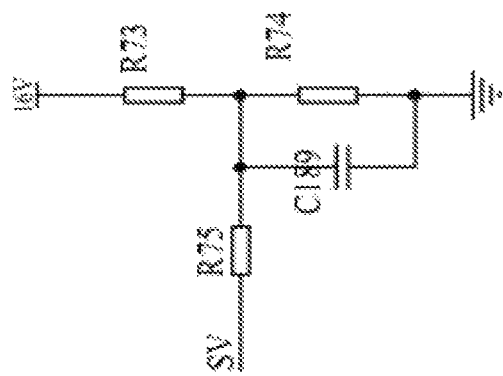

As shown in FIGS. 3A-3B, the transmitting Bluetooth-communication and control circuit 3 includes the Bluetooth chip N14, the regulator chip N13 and the regulator chip N12. The pin DVDD2 of the chip N14 is connected to the pin DVDD1 of the chip N14, a 3.3V power source, the grounded capacitor C196 and the grounded capacitor C195, respectively. The pin GND of the chip N14 is grounded. The pin NC of the chip N14 is connected to the 3.3V power source. The pin P1_0 of the chip N14 is connected to the transmitting switching circuit 4. The pin P1_1 of the chip N14 is connected to the cathode of the light emitting diode LED6, and the anode of the light emitting diode LED6 is connected to one end of the resistor R79. The other end of the resistor R79 is connected to one end of the resistor R78 and the 3.3V power source, respectively. The other end of the resistor R78 is connected to the anode of the light emitting diode LED5, and the cathode of the light emitting diode LED5 is connected to the pin P1_2 of the chip N14. The pin P1_3 of the chip N14 is connected to the regulator circuit 5. The pin P1_7 of the chip N14 is connected to the transmitting switching circuit 4. The pin P0_6 of the chip N14 is connected to one end of the resistor R77, and the other end of the resistor R77 is connected to the regulator circuit 5. The pin P0_7 of the chip N14 is connected to one end of the resistor R75. The other end of the resistor R75 is connected to one end of the capacitor C189, one end of the resistor R74 and one end of the resistor R73, respectively. The other end of the capacitor C189 is connected to the other end of the resistor R74, and is grounded. The other end of the resistor R73 is connected to the regulator circuit 5. The pin AVDD5 of the chip N14 is connected to the 3.3V power source and the grounded capacitor C183, respectively. The pin AVDD3 of the chip N14 is connected to the grounded capacitor C184, the 3.3V power source, the pin AVDD2 of the chip N14, the pin AVDD1 of the chip N14, the pin AVDD4 of the chip N14, the grounded capacitor C182, the grounded capacitor C181, the grounded capacitor C180, the pin AVDD6 of the chip N14, one end of the capacitor C185, one end of the capacitor C179 and one end of the inductor L8, respectively. The other end of the capacitor C185 is connected to the other end of the capacitor C179, and is grounded. The other end of the inductor L8 is connected to a power source VCC, one end of the capacitor C178, one end of the capacitor C177 and the pin Vout of the chip N13, respectively. The other end of the capacitor C178 is connected to the other end of the capacitor C177, the pin GND of the chip N13, one end of the capacitor C170 and one end of the capacitor C169, respectively. The other end of the capacitor C170 is connected to the pin Vin of the chip N13, the other end of the capacitor C169, one end of the capacitor C167, the pin Vout of the chip N12 and the transmitting switching circuit 4, respectively. The pin GND of the chip N12 is connected to one end of the capacitor C168 and the other end of the capacitor C167, respectively. The pin Vin of the chip N12 is connected to the other end of the capacitor C168 and the regulator circuit 5, respectively. The pin RF_P of the chip N14 is connected to one end of the capacitor C186. The other end of the capacitor C186 is connected to one end of the inductor L9 and one end of the capacitor C187, respectively. The other end of the inductor L9 is grounded. The other end of the capacitor C187 is connected to one end of the inductor L10 and one end of the inductor L11, respectively. The other end of the inductor L11 is connected to the grounded capacitor C188 and one end of the inductor L12, respectively. The other end of the inductor L12 is connected to the transmitting antenna. The pin RF_N of the chip N14 is connected to one end of the capacitor C190. The other end of the capacitor C190 is connected to the grounded capacitor C191 and the other end of the inductor L10, respectively. The pin XOSC_Q1 of the chip N14 is connected to the grounded capacitor C192 and one end of the crystal oscillator Y2, respectively. The other end of the crystal oscillator Y2 is connected to the pin XOSC_Q2 of the chip N14 and the grounded capacitor C193, respectively. The pin DCOUPL of the chip N14 is connected to the grounded capacitor C194. The pin R_BIAS of the chip N14 is connected to the grounded resistor R76. The pin GND of the chip N14 is grounded.

In the present invention, the transmitting Bluetooth-communication and control circuit is configured to detect and collect a voltage of the radio-frequency power amplifier circuit and control the switch array circuit to be turned on/off, thereby implementing the self-adaptive matching solution of the transmitting module.

Figure 4A:
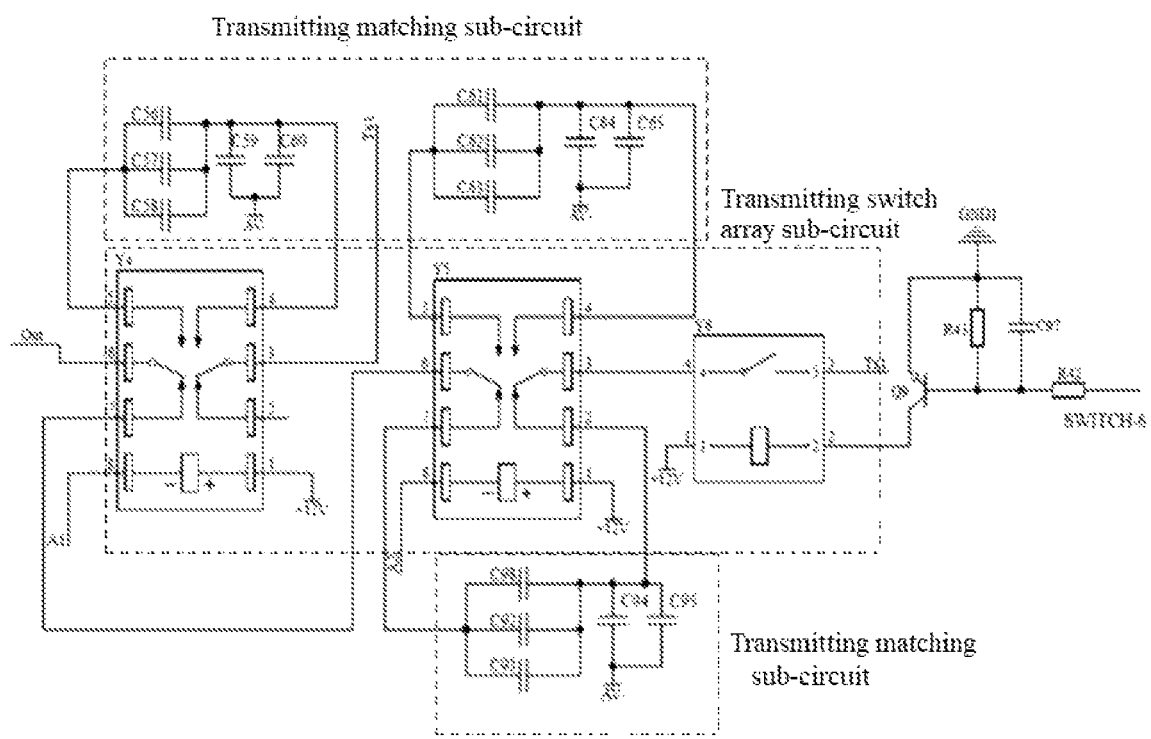
FIGS. 4A-4C are schematic diagrams showing a transmitting switching circuit in the present invention, wherein, the 8$^{th}$ pin of the relay Y4 in FIG. 4A is connected to the cathode of the diode D4 and the collector of the triode Q6 in FIG. 4B, respectively, and the 8$^{th}$ pin of the relay Y5 in FIG. 4A is connected to the cathode of the diode D3 and the collector of the triode Q7 in FIG. 4C, respectively.
Figure 4B:
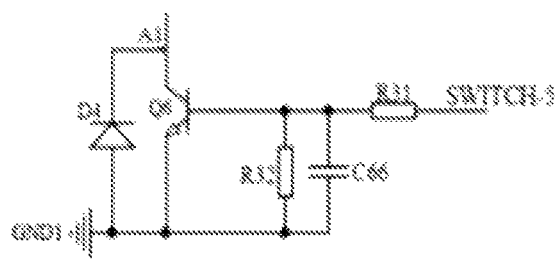
Figure 4C:
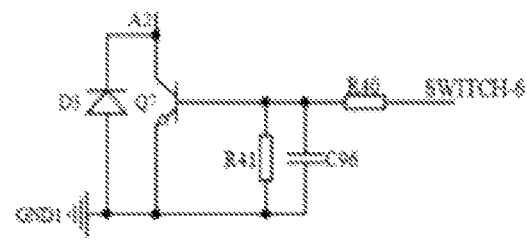

As shown in FIGS. 4A-4C, the transmitting switching circuit 4 includes a transmitting matching sub-circuit and a transmitting switch array sub-circuit. The transmitting switch array sub-circuit includes the relay Y4, the relay Y5, and the relay Y6. The $5^{th}$ pin and the $4^{th}$ pin of the relay Y4 are connected to the transmitting matching sub-circuit, respectively. The $6^{th}$ pin of the relay Y4 is connected to the radio-frequency power amplifier circuit 6. The $8^{th}$ pin of the relay Y4 is connected to the cathode of the diode D4 and the collector of the triode Q6. The emitter of the triode Q6 is connected to the anode of the diode D4, one end of the resistor R32 and one end of the capacitor C66, respectively, and is grounded. The base of the triode Q6 is connected to the other end of the resistor R32, the other end of the capacitor C66 and one end of the resistor R31, respectively. The other end of the resistor R31 is connected to the pin P1_7 of the chip N14. The $1^{st}$ pin of the relay Y4 is connected to the pin Vin of the chip N13. The $3^{rd}$ pin of the relay Y4 is connected to the $3^{rd}$ pin of the relay Y6. The $7^{th}$ pin of the relay Y4 is connected to the $6^{th}$ pin of the relay Y5. The $4^{th}$ pin, the $5^{th}$ pin, the $7^{th}$ pin and the $2^{nd}$ pin of the relay Y5 are connected to the transmitting matching sub-circuit, respectively. The $1^{st}$ pin of the relay Y5 is connected to the pin Vin of the chip N13. The $3^{rd}$ pin of the relay Y5 is connected to the $4^{rd}$ pin of the relay Y6. The $8^{th}$ pin of the relay Y5 is connected to the cathode of the diode D3 and the collector of the triode Q7, respectively. The base of the triode Q7 is connected to one end of the resistor R41, one end of the capacitor C96 and one end of the resistor R40, respectively. The other end of the resistor R40 is connected to the pin P1_0 of the chip N14. The anode of the diode D3 is connected to the emitter of the triode Q7, the other end of the resistor R41 and the other end of the capacitor C96, respectively, and is grounded. The $1^{st}$ pin of the relay Y6 is connected to the pin Vin of the chip N13. The $2^{nd}$ pin of the relay Y6 is connected to the collector of the triode Q9. The emitter of the triode Q9 is connected to one end of the resistor R43 and one end of the capacitor C97, respectively, and is grounded. The base of the triode Q9 is connected to the other end of the resistor R43, the other end of the capacitor C97 and one end of the resistor R42, respectively. The other end of the resistor R42 is connected to the pin P1_0 of the chip N14.

The transmitting matching sub-circuit includes the capacitor C56, the capacitor C57, the capacitor C58, the capacitor C59, the capacitor C60, the capacitor C61, the capacitor C62, the capacitor C63, the capacitor C64, the capacitor C65, the capacitor C98, the capacitor C92, the capacitor C93, the capacitor C94 and the capacitor C95. One end of the capacitor C56 is connected to one end of the capacitor C57, one end of the capacitor C58 and the $5^{th}$ pin of the relay Y4, respectively. The other end of the capacitor C56 is connected to the other end of the capacitor C57, the other end of the capacitor C58, one end of the capacitor C59, one end of the capacitor C60 and the $4^{th}$ pin of the relay Y4, respectively. The other end of the capacitor C59 is connected to the other end of the capacitor C60 and the regulator circuit 5, respectively. One end of the capacitor C61 is connected to one end of the capacitor C62, one end of the capacitor C63 and the $5^{th}$ pin of the relay Y5. The other end of the capacitor C61 is connected to the other end of the capacitor C62, the other end of the capacitor C63, one end of the capacitor C64, one end of the capacitor C65 and the $4^{th}$ pin of the relay Y5, respectively. The other end of the capacitor C64 is connected to the other end of the capacitor C65 and the regulator circuit 5, respectively. One end of the capacitor C98 is connected to one end of the capacitor C92, one end of the capacitor C93 and the $7^{th}$ pin of the relay Y5, respectively. The other end of the capacitor C98 is connected to the other end of the capacitor C92, the other end of the capacitor C93, one end of the capacitor C94, the $2^{nd}$ pin of the relay Y5 and one end of the capacitor C95, respectively. The other end of the capacitor C95 is connected to the other end of the capacitor C94 and the regulator circuit 5, respectively. The number of the transmitting matching sub-circuits is at least two. In the present invention, the transmitting switching circuit is designed into the switch array circuit, and different transmitting matching circuits are switched, so as to improve the transmission efficiency between the receiving and transmitting antennas in case of different distances, thereby increasing an overall efficiency of the system.

Figure 5A:
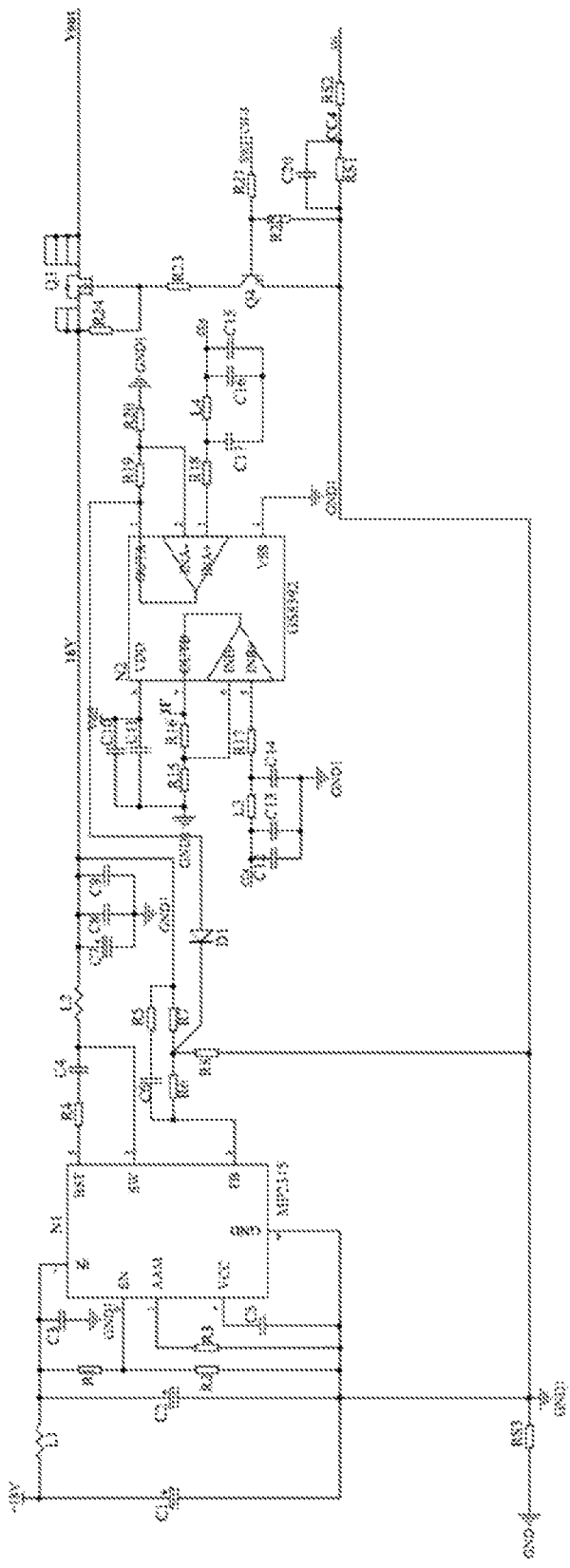
FIGS. 5A-5B are schematic diagrams showing a regulator circuit in the present invention, wherein the pin VDD of the chip N2 in FIG. 5A is connected to the pin Vout of the chip N3 in FIG. 5B.
Figure 5B:
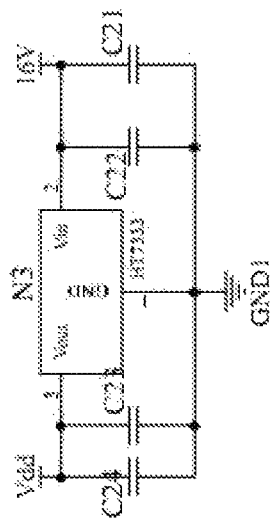

As shown in FIGS. 5A-5B, the regulator circuit 5 includes the conversion chip N1, the operational amplifier chip N2, the metal oxide semiconductor (MOS) transistor Q3 and the regulator chip N3. The pin IN of the chip N1 is connected to the grounded capacitor C3, one end of the resistor R1, the anode of the polar capacitor C2 and one end of the magnetic bead L1, respectively. The other end of the magnetic bead L1 is connected to the anode of the polar capacitor C1 and the pin Vin of the chip N12, respectively. The pin EN of the chip N1 is connected to the other end of the resistor R1 and one end of the resistor R2, respectively. The pin AAM of the chip N1 is connected to one end of the resistor R3. The pin VCC of the chip N1 is connected to one end of the capacitor C5. The other end of the capacitor C5 is connected to the other end of the resistor R3, the other end of the resistor R2, the cathode of the polar capacitor C2, the cathode of the polar capacitor C1, the pin GND of the chip N1, the grounded resistor RS3, one end of the resistor R8, the emitter of the triode Q4, one end of the resistor R22, one end of the resistor RS1 and one end of a capacitor C20, respectively, and is grounded. The pin FB of the chip N1 is connected to one end of the resistor R6 and one end of the capacitor C6, respectively. The other end of the resistor R6 is connected to the other end of the resistor R8, the cathode of the diode D1 and one end of the resistor R7, respectively. The other end of the capacitor C6 is connected to one end of the resistor R5. The other end of the resistor R5 is connected to the other end of the resistor R7, the grounded capacitor C9, the grounded capacitor C8, the grounded capacitor C7, one end of the inductor L2, one end of the resistor R24 and the source of the MOS transistor Q3, respectively. The other end of the inductor L2 is connected to the pin SW of the chip N1 and one end of the capacitor C4, respectively. The other end of the capacitor C4 is connected to one end of the resistor R4, and the other end of the resistor R4 is connected to the pin BST of the chip N1. The collector of the triode Q4 is connected to one end of the resistor R23. The other end of the resistor R23 is connected to the other end of the resistor R24 and the gate of the MOS transistor Q3, respectively. The drain of the MOS transistor Q3 is connected to the radio-frequency power amplifier circuit 6. The base of the triode Q4 is connected to one end of the resistor R21 and the other end of the resistor R22, respectively. The other end of the resistor R21 is connected to the pin P1_3 of the chip N14.

The pin VDD of the chip N2 is connected to one end of the capacitor C10, one end of the capacitor C11 and the pin Vout of the chip N3, respectively. The other end of the capacitor C10 is connected to the other end of the capacitor C11 and one end of the resistor R15, respectively, and is grounded. The pin OUTB of the chip N2 is connected to one end of the resistor R16 and the other end of the resistor R77, respectively. The other end of the resistor R16 is connected to the other end of the resistor R15 and the pin INB− of the chip N2, respectively. The pin INB+ of the chip N2 is connected to one end of the resistor R17. The other end of the resistor R17 is connected to one end of the inductor L3 and one end of the capacitor C14, respectively. The other end of the inductor L3 is connected to one end of the capacitor C13, one end of the capacitor C12, one end of the capacitor C15, one end of the capacitor C16, one end of the resistor L4, the other end of the resistor RS1, one end of the resistor RS2 and the other end of the capacitor C20, respectively. The other end of the resistor RS2 is connected to the radio-frequency power amplifier circuit 6. The other end of the capacitor C12 is connected to the other end of the capacitor C13 and the other end of the capacitor C14, respectively, and is grounded. The pin VSS of the chip N2 is grounded. The pin INA+ of the chip N2 is connected to one end of the resistor R18. The other end of the resistor R18 is connected to one end of the capacitor C17 and the other end of the resistor L4, respectively. The other end of the capacitor C17 is connected to the other end of the capacitor C16 and the other end of the capacitor C15, respectively. The pin INA− of the chip N2 is connected to one end of the resistor R19 and the grounded resistor R20, respectively. The other end of the resistor R19 is connected to the pin OUTA of the chip N2 and the anode of the diode D1, respectively.

The pin Vout of the chip N3 is further connected to one end of the capacitor C23 and one end of the capacitor C24, respectively. The other end of the capacitor C23 is connected to the other end of the capacitor C24, the pin GND of the chip N3, one end of the capacitor C22 and one end of the capacitor C21, respectively. The other end of the capacitor C22 is connected to the other end of the capacitor C21, the pin Vin of the chip N3 and the other end of the resistor R73, respectively.

In the present invention, a stable voltage may be effectively provided by the regulator circuit for the radio-frequency power amplifier circuit, which guarantees stable work of the radio-frequency power amplifier circuit.

Figure 6:
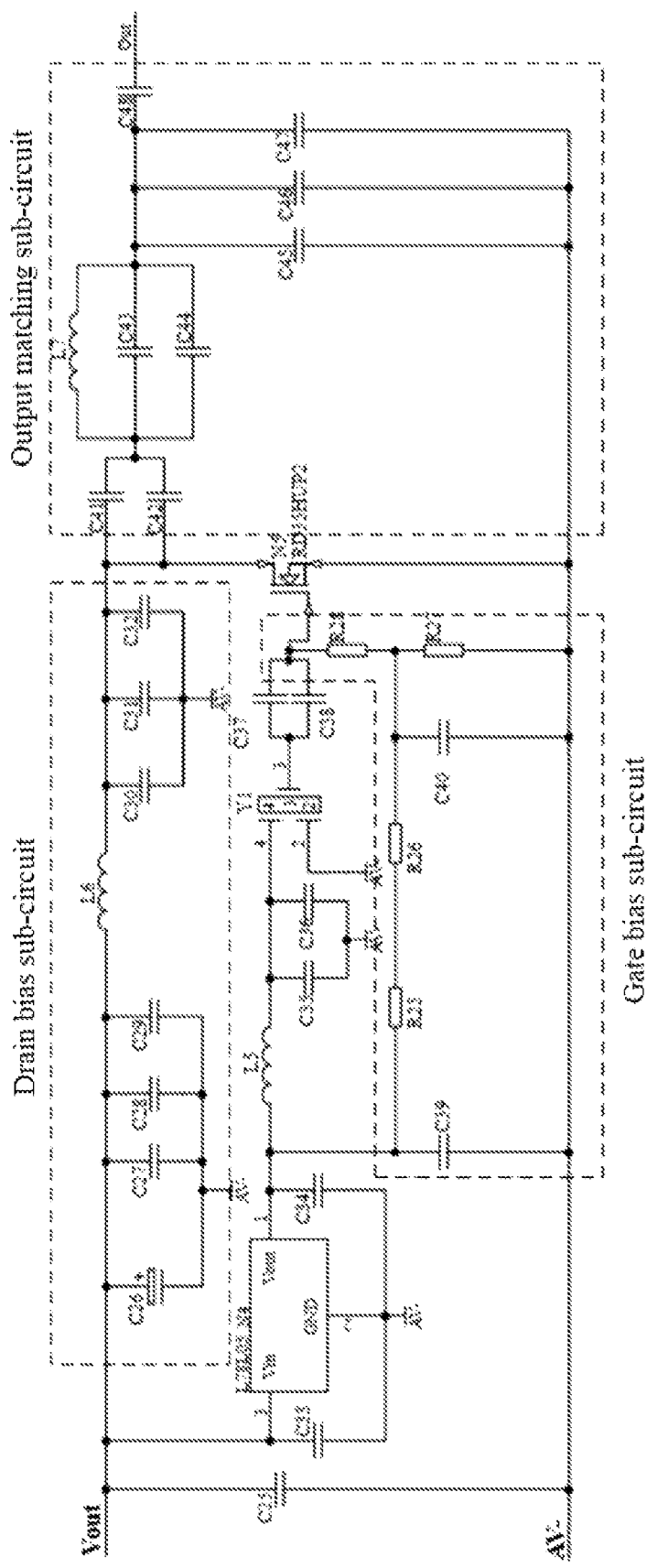
FIG. 6 is a schematic diagram of a radio-frequency power amplifier circuit in the present invention.

As shown in FIG. 6, the radio-frequency power amplifier circuit 6 includes the integrated regulator chip N4, the power amplifier tube N5, a drain bias sub-circuit, an output matching sub-circuit and a gate bias sub-circuit.

The pin Vin of the chip N4 is connected to one end of the capacitor C33, the drain of the MOS transistor Q3, one end of the capacitor C25 and the drain bias sub-circuit, respectively. The other end of the capacitor C25 is connected to the other end of the resistor RS2 and the gate bias sub-circuit, respectively. The pin GND of the chip N4 is connected to the other end of the resistor RS2, the other end of the capacitor C33 and one end of the capacitor C34, respectively. The other end of the capacitor C34 is connected to the pin Vout of the chip N4, the gate bias sub-circuit and one end of the inductor L5, respectively. The other end of the inductor L5 is connected to one end of the capacitor C35, one end of the capacitor C36 and the $4^{th}$ pin of the crystal oscillator Y1, respectively. The other end of the capacitor C35 is connected to the other end of the resistor RS2 and the other end of the capacitor C36, respectively. The $2^{nd}$ pin of the crystal oscillator Y1 is connected to the other end of the resistor RS2. The $3^{rd}$ pin of the crystal oscillator Y1 is connected to one end of the capacitor C37 and one end of the capacitor C38, respectively. The other end of the capacitor C37 is connected to the other end of the capacitor C38 and the gate bias sub-circuit, respectively.

The drain bias sub-circuit includes the polar capacitor C26, the capacitor C27, the capacitor C28, the capacitor C29, the inductor L6, the capacitor C30, the capacitor C31 and the capacitor C32. The anode of the polar capacitor C26 is connected to the pin Vin of the chip N4, one end of the capacitor C27, one end of the capacitor C28, one end of the capacitor C29 and one end of the inductor L6, respectively. The cathode of the polar capacitor C26 is connected to the other end of the capacitor C27, the other end of the capacitor C28, the other end of the capacitor C29 and the other end of the resistor RS2, respectively. The other end of the inductor L6 is connected to one end of the capacitor C30, one end of the capacitor C31, one end of the capacitor C32, the drain of the power amplifier tube N5 and the output matching sub-circuit, respectively. The other end of the capacitor C30 is connected to the other end of the resistor RS2, the other end of the capacitor C31 and the other end of the capacitor C32, respectively.

The gate bias sub-circuit includes the capacitor C39, the resistor R25, the resistor R26, the resistor R27, the resistor R28 and the capacitor C40. One end of the capacitor C39 is connected to the pin Vout of the chip N4 and one end of the resistor R25, respectively. The other end of the resistor R25 is connected to one end of the resistor R26. The other end of the resistor R26 is connected to one end of the capacitor C40, one end of the resistor R27 and one end of the resistor R28, respectively. The other end of the capacitor C40 is connected to the other end of the capacitor C39, the other end of the resistor R27, the source of the power amplifier tube N5, the output matching sub-circuit and the other end of the capacitor C25, respectively. The other end of the resistor R28 is connected to the other end of the capacitor C37 and the gate of the power amplifier tube N5, respectively.

The output matching sub-circuit includes the capacitor C41, the capacitor C42, the capacitor C43, the capacitor C44, the inductor L7, the capacitor C45, the capacitor C46, the capacitor C47 and the capacitor C48. One end of the capacitor C41 is connected to the drain of the power amplifier tube N5, one end of the capacitor C42 and the other end of the inductor L6, respectively. The other end of the capacitor C41 is connected to the other end of the capacitor C42, one end of the inductor L7, one end of the capacitor C43 and one end of the capacitor C44, respectively. The other end of the inductor L7 is connected to the other end of the capacitor C43, the other end of the capacitor C44, one end of the capacitor C45, one end of the capacitor C46, one end of the capacitor C47 and one end of the capacitor C48, respectively. The other end of the capacitor C48 is connected to the $6^{th}$ pin of the relay Y4. The other end of the capacitor C45 is connected to the other end of the capacitor C46, the other end of the capacitor C47 and the source of the power amplifier tube N5, respectively.

In the present invention, a matching solution achieved by lumped elements is adopted in the radio-frequency power amplifier circuit, which may provide effective transmitting power for the transmitting antenna.

Figure 7A:
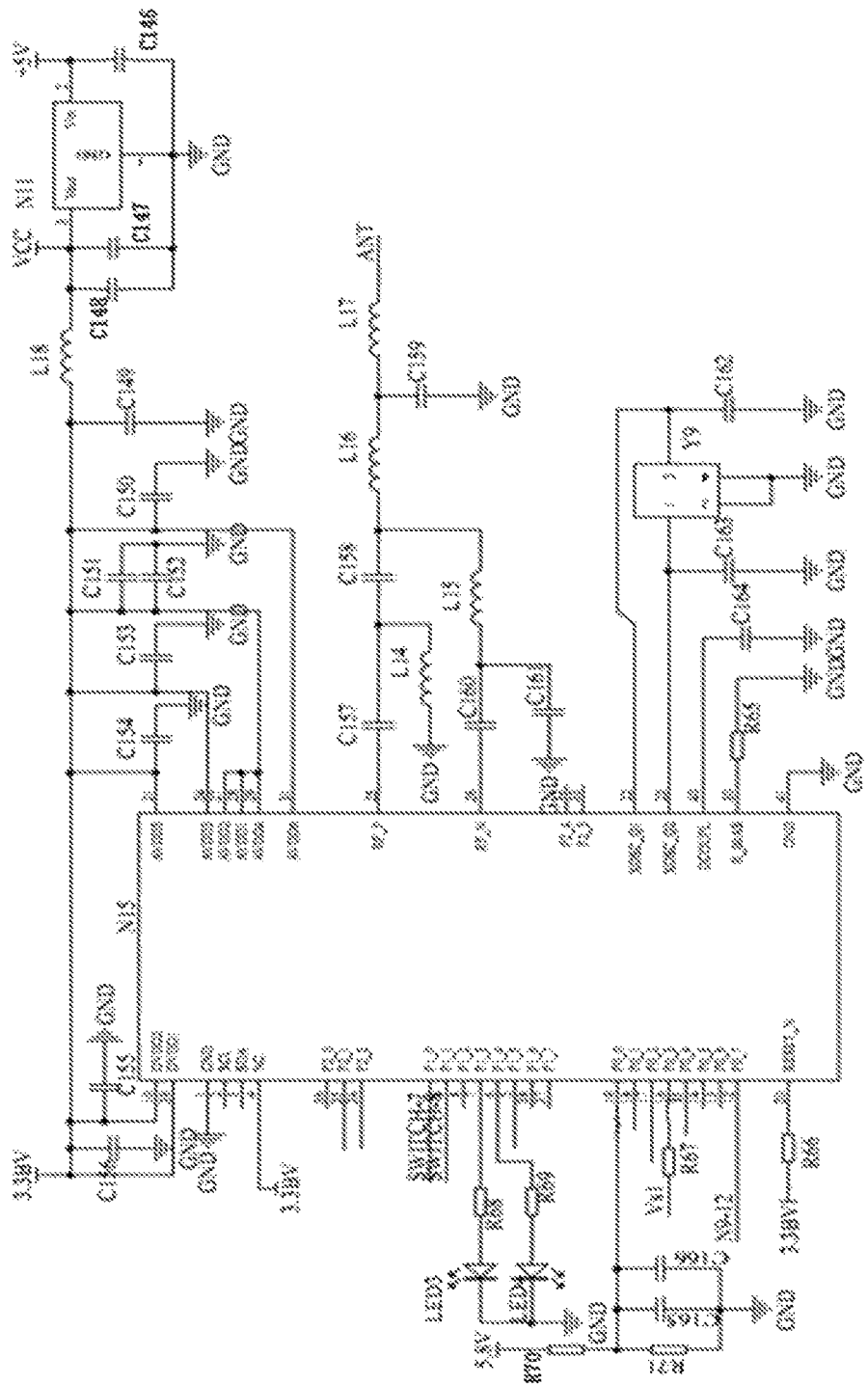
FIGS. 7A-7B are schematic diagrams showing a receiving Bluetooth-communication and control circuit in the present invention, wherein the pin P1_0 of the chip N15 in FIG. 7A is connected to one end of the resistor R53 in FIG. 7B.
Figure 7B:
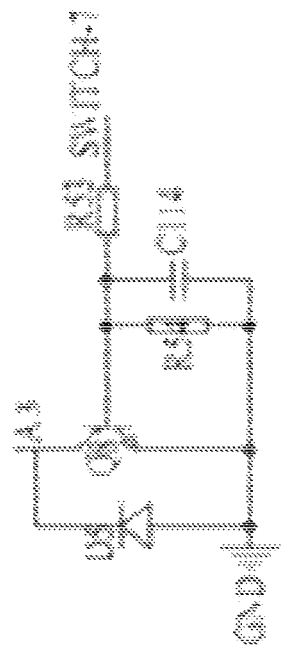

As shown in FIGS. 7A-7B, the receiving Bluetooth-communication and control circuit 7 includes the Bluetooth chip N15 and the regulator chip N11. The pin DVDD2 of the chip N15 is connected to the grounded capacitor C155, the grounded capacitor C156, the pin DVDD1 of the chip N15, a 3.3BV power source, the pin AVDD5 of the chip N15, the grounded capacitor C154, the grounded capacitor C153, the pin AVDD3 of the chip N15, the grounded capacitor C151, the grounded capacitor C152, the pin AVDD2 of the chip N15, the pin AVDD1 of the chip N15, the pin AVDD4 of the chip N15, the pin AVDD6 of the chip N15, the grounded capacitor C150, the grounded capacitor C149, and one end of the inductor L18, respectively. The other end of the inductor L18 is connected to the power source VCC, one end of the capacitor C148, one end of the capacitor C147 and the pin Vout of the chip N11, respectively. The pin Vin of the chip N11 is connected to a 5V power source and one end of the capacitor C146, respectively. The other end of the capacitor C146 is connected to the other end of the capacitor C147, the other end of the capacitor C148 and the pin GND of the chip N11, respectively, and is grounded. The pin GND of the chip N15 is grounded. The pin NC of the chip N15 is connected to the 3.3BV power source. The pin P1_0 of the chip N15 is connected to one end of the resistor R53. The other end of the resistor R53 is connected to one end of the resistor R54, one end of the capacitor C114 and the base of the triode Q8, respectively. The emitter of the triode Q8 is connected to the other end of the resistor R54, the other end of the capacitor C114 and the anode of the diode D5, respectively, and is grounded. The cathode of the diode D5 is connected to the collector of the triode Q8 and the receiving switching circuit 8, respectively. The pin P1_1 of the chip N15 is connected to the receiving switching circuit 8. The pin P1_3 of the chip N15 is connected to one end of the resistor R68, and the other end of the resistor R68 is connected to the anode of the light emitting diode LED3. The pin P1_4 pin of the chip N15 is connected to one end of the resistor R69, and the other end of the resistor R69 is connected to the anode of the light emitting diode LED4. The cathode of the light emitting diode LED4 is connected to the cathode of the light emitting diode LED3, and is grounded. The pin P0_0 of the chip N15 is connected to the grounded capacitor C166, the grounded capacitor C165, the grounded resistor R71 and one end of the resistor R70, respectively. The other end of the resistor R70 is connected to a 5.8V power source. The pin P0_3 of the chip N15 is connected to one end of the resistor R67, and the other end of the resistor R67 is connected to the rectifier and regulator circuit 9. The pin P0_7 of the chip N15 is connected to the rectifier and regulator circuit 9. The pin RESET_N of the chip N15 is connected to one end of the resistor R66, and the other end of the resistor R66 is connected to the 3.3BV power source. The pin GND of the chip N15 is grounded. The pin R_BIAS of the chip N15 is connected to the grounded resistor R65. The pin DCOUPL of the chip N15 is connected to the grounded capacitor C164. The pin XOSC_Q2 of the chip N15 is connected to the grounded capacitor C163 and the $1^{st}$ pin of the crystal oscillator Y9, respectively. The $2^{nd}$ pin of the crystal oscillator Y9 is connected to the $4^{th}$ pin of the crystal oscillator Y9, and is grounded. The $3^{rd}$ pin of the crystal oscillator Y9 is connected to the grounded capacitor C162 and the pin XOSC_Q1 of the chip N15, respectively. The pin RF_N of the chip N15 is connected to one end of the capacitor C160. The other end of the capacitor C160 is connected to one end of the inductor L15 and the grounded capacitor C161, respectively. The other end of the inductor L15 is connected to one end of the inductor L16 and one end of the capacitor C158, respectively. The other end of the capacitor C158 is connected to one end of the capacitor C157 and one end of the inductor L14, respectively. The other end of the inductor L14 is grounded. The other end of the capacitor C157 is connected to the pin RF_P of the chip N15. The other end of the inductor L16 is connected to one end of the inductor L17 and one end of the grounded capacitor C159, respectively. The other end of the inductor L17 is connected to the receiving antenna.

In the present invention, the receiving Bluetooth-communication and control circuit is configured to detect and collect a rectifier voltage of the rectifier and regulator circuit and control the on/off of the switch array circuit, thereby implementing the self-adaptive matching solution of a receiving module.

Figure 8:
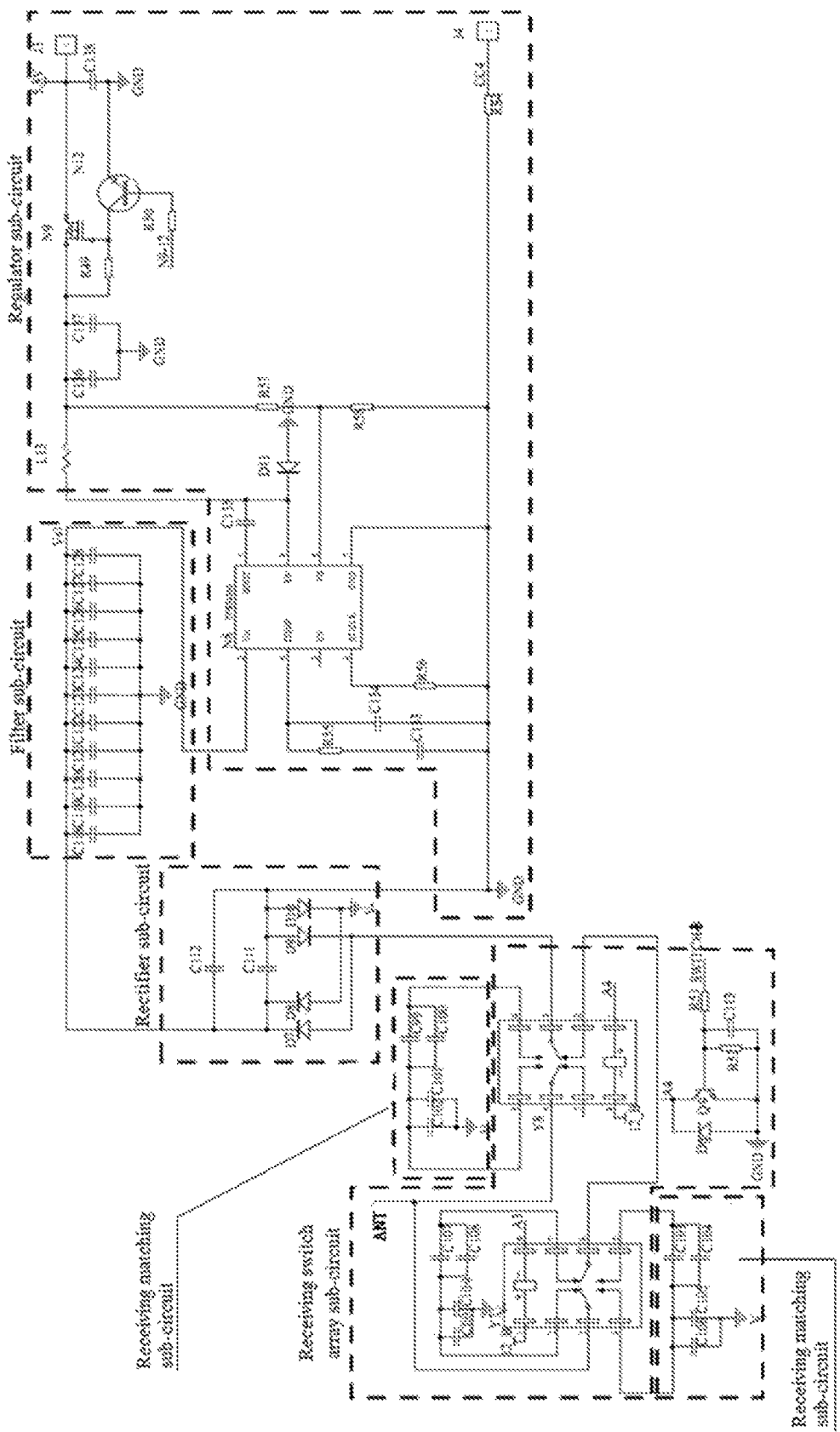
FIG. 8 is a schematic diagram showing the connection between a receiving switching circuit and a rectifier and regulator circuit in the present invention.

As shown in FIG. 8, the receiving switching circuit 8 includes a receiving switch array sub-circuit and a receiving matching sub-circuit. The receiving switch array sub-circuit including the relay Y7 and the relay Y8. The $1^{st}$ pin of the relay Y7 is connected to a 12BV power source. The $2^{nd}$ pin of the relay Y7 is connected to the grounded capacitor C110, the grounded capacitor C109, one end of the capacitor C107 and one end of the capacitor C108, respectively. The other end of the capacitor C107 is connected to the other end of the capacitor C108 and the $7^{th}$ pin of the relay Y7, respectively. The $3^{rd}$ pin of the relay Y7 is connected to one end of the receiving antenna and the $6^{th}$ pin of the relay Y8, respectively. The 4$^{th}$ pin and the 5$^{th}$ pin of the relay Y7 are connected to the receiving matching sub-circuit, respectively. The 6$^{th}$ pin of the relay Y7 is connected to the 2$^{nd}$ pin of the relay Y8. The 8$^{th}$ pin of the relay Y7 is connected to the collector of the triode Q8. The 5$^{th}$ pin and the 4$^{th}$ pin of the relay Y8 are connected to the receiving matching sub-circuit, respectively. The 3$^{rd}$ pin of the relay Y8 is connected to the rectifier and regulator circuit 9. The 8$^{th}$ pin of the relay Y8 is connected to the 12BV power source. The 1$^{st}$ pin of the relay Y8 is connected to the collector of the triode Q9 and the cathode of the diode D6, respectively. The base of the triode Q9 is connected to one end of the resistor R52, one end of the capacitor C113 and one end of the resistor R51, respectively. The other end of the resistor R51 is connected to the pin P1_1 of the chip N15. The other end of the capacitor C113 is connected to the other end of the resistor R52, the emitter of the triode Q9 and the anode of the diode D6, respectively, and is grounded.

The receiving matching sub-circuit includes the grounded capacitor C102, the grounded capacitor C101, the capacitor C99, the capacitor C100, the grounded capacitor C105, the grounded capacitor C106, the capacitor C103 and the capacitor C104. One end of the capacitor C99 is connected to one end of the capacitor C100, the grounded capacitor C101, the grounded capacitor C102 and the 5$^{th}$ pin of the relay Y8, respectively. The other end of the capacitor C99 is connected to the other end of the capacitor C100 and the 4$^{th}$ pin of the relay Y8, respectively. One end of the capacitor C103 is connected to the grounded capacitor C105, the grounded capacitor C106, one end of the capacitor C104 and the 4$^{th}$ pin of the relay Y7, respectively. The other end of the capacitor C103 is connected to the other end of the capacitor C104 and the 5$^{th}$ pin of the relay Y7, respectively. The number of the receiving matching sub-circuits is at least two.

In the present invention, the receiving switching circuit is designed into the switch array circuit, and different receiving matching circuits are switched, so as to improve the transmission efficiency between the receiving and transmitting antennas in case of different distances, thereby increasing the overall efficiency of the system.

As shown in FIG. 8, the rectifier and regulator circuit 9 includes a rectifier sub-circuit, a filter sub-circuit and a regulator sub-circuit. The rectifier sub-circuit includes the capacitor C112, the capacitor C111, the diode D7, the diode D8, the diode D9 and the diode D10. One end of the capacitor C112 is connected to the cathode of the diode D7, the cathode of the diode D8, one end of the capacitor C111 and the filter sub-circuit, respectively. The other end of the capacitor C112 is connected to the other end of the capacitor C111, the anode of the diode D9, the anode of the diode D10 and the regulator sub-circuit, respectively. The anode of the diode D7 is connected to the cathode of the diode D9 and the 3$^{rd}$ pin of the relay Y8, respectively. The anode of the diode D8 is connected to the cathode of the diode D10 and is grounded.

The filter sub-circuit includes the grounded capacitor C118, the grounded capacitor C119, the grounded capacitor C120, the grounded capacitor C121, the grounded capacitor C122, the grounded capacitor C123, the grounded capacitor C124, the grounded capacitor C125, the grounded capacitor C126, the grounded capacitor C127 and the grounded capacitor C128. The grounded capacitor C118 is connected to one end of the capacitor C112, the grounded capacitor C119, the grounded capacitor C120, the grounded capacitor C121, the grounded capacitor C122, the grounded capacitor C123, the grounded capacitor C124, the grounded capacitor C125, the grounded capacitor C126, the grounded capacitor C127, the grounded capacitor C128, the other end of the resistor R67 and the regulator sub-circuit, respectively.

The regulator sub-circuit includes the power conversion chip N8 and the triode N12. The pin Vin of the chip N8 is connected to the grounded capacitor C118. The pin COMP of the chip N8 is connected to one end of the resistor R55 and one end of the capacitor C134, respectively. The other end of the resistor R55 is connected to one end of the capacitor C133. The other end of the capacitor C133 is connected to the other end of the capacitor C112, the other end of the capacitor C134, one end of the resistor R56, the pin GND of the chip N8, one end of the resistor R58 and one end of the resistor RS4, respectively. The other end of the resistor RS4 is connected to the interface J4 of a rectifier and regulator output voltage end. The other end of the resistor R56 is connected to the pin RT/CLK of the chip N8. The pin FB of the chip N8 is connected to the other end of the resistor R58 and one end of the resistor R57, respectively. The other end of the resistor R57 is connected to the grounded capacitor C136, the grounded capacitor C137, one end of the inductor L13, one end of the resistor R49 and the source of the MOS transistor N9, respectively. The other end of the resistor R49 is connected to the collector of the triode N12 and the gate of the MOS transistor N9, respectively. The drain of the MOS transistor N9 is connected to the 5.8V power source, the interface J3 of the rectifier and regulator output voltage end and one end of the capacitor C138, respectively. The other end of the capacitor C138 is connected to the emitter of the triode N12 and is grounded. The base of the triode N12 is connected to one end of the resistor R50, and the other end of the resistor R50 is connected to the pin P0_7 of the chip N15. The other end of the inductor L13 is connected to the cathode of a diode D11, one end of the capacitor C135 and the pin SW of the chip N8, respectively. The anode of the diode D11 is grounded. The other end of the capacitor C135 is connected to the pin BOOT of the chip N8.

In the rectifier and regulator circuit in the present invention, a bridge rectifier of the bridge rectifier sub-circuit includes four rectifier diodes to convert a high-frequency alternating current received by the magnetic-resonance receiving antenna into a direct current. The regulator sub-circuit includes the voltage-drop integrated chip N8 and a feedback circuit. The direct current obtained after passing through the bridge rectifier is fed into the voltage-drop integrated chip N8, and a required voltage value may be set by adjusting a value of a feedback pin. The filter sub-circuit makes the output voltage stable and clean.

In the present embodiment, the transmitting Bluetooth-communication and control circuit 3 detects a connection with the receiving Bluetooth-communication and control circuit 7, and if not existing, the connection is tried continuously until a successful connection. After the successful connection, whether an apparatus is connected is detected, and if not, the detection is continued. After the apparatus is connected, a no-load rectifier voltage Vreg1 is detected, and V1 is set as a matched switching voltage V1. When Vreg1 is less than V1, an antenna matching solution of the magnetic-resonance transmitting module 1 and the magnetic-resonance receiving modules 2 is selected to be switched. When Vreg1 is greater than V1, a charging process is directly started without selecting the switching action. In the charging process, an on-load rectifier voltage Vreg2 is detected. Vhigh is set as an upper limit voltage of the switching matching solution, and Vlow is set as a lower limit voltage of the switching matching solution. When Vreg2 is less than Vlow or Vreg2 is greater than Vhigh, the matching solution of the magnetic-resonance transmitting module 1 and the magnetic-resonance receiving module 2 is selected to be switched for continuous charging, otherwise the solution is not switched, and the charging process continues, and the charging process is stopped when a charging current I is less than Imin.

In the present embodiment, the power adapter supplies power to the radio-frequency power amplifier circuit 6 through the regulator circuit 5, and simultaneously supplies power to the transmitting Bluetooth-communication and control circuit 5. Then, power is output to the transmitting antenna through the radio-frequency power amplifier circuit 6. The logic process in the above-mentioned embodiment is adopted by the receiving antenna and the transmitting antenna according to different distances thereof, different transmitting matching sub-circuits and different receiving matching sub-circuits are selected by switching the transmitting switching circuit 4 and the receiving switching circuits 8 to transfer energy to the receiving antenna. The energy is converted into a direct current through the rectifier and regulator circuit 9, and the direct current passes through the filter sub-circuit to the regulator sub-circuit. The output voltage of the regulator sub-circuit serves as a working voltage of the electronic apparatus. In the present invention, the transmitting Bluetooth-communication and control circuit 3 is configured to detect and collect the voltage of the radio-frequency power amplifier circuit 6 and control the on/off of the switch array circuit, and the receiving Bluetooth-communication and control circuit 7 is configured to detect and collect the rectifier voltage of the rectifier and regulator circuit 9 and control the on/off of the switch array circuit. The self-adaptive matching solution for magnetic-resonance wireless power transmission is adopted in the present invention, that is, the information between the receiving and transmitting antennas is collected by the receiving Bluetooth-communication and control circuit 7 and the transmitting Bluetooth-communication and control circuit 3, and the plurality of receiving antenna-transmitting antenna matching solutions are used and switched by the switch array circuit, so as to solve the problem of the poor transmission efficiency between the receiving and transmitting antennas due to the overcoupling phenomenon caused by the excessively small distance and the undercoupling phenomenon caused by the excessively large distance in the magnetic-resonance wireless power transmission process, thereby greatly improving the transmission efficiency in case of different distances.

What is claimed is:

1. A self-adaptive matching system for a magnetic-resonance wireless charging process, comprising a magnetic-resonance transmitting module and a magnetic-resonance receiving module connected to the magnetic-resonance transmitting module; wherein the magnetic-resonance transmitting module comprises a transmitting Bluetooth-communication and control circuit, a transmitting switching circuit, a regulator circuit, a transmitting antenna and a radio-frequency power amplifier circuit; wherein, the transmitting switching circuit, the regulator circuit and the transmitting antenna are connected to the transmitting Bluetooth-communication and control circuit, respectively;

the radio-frequency power amplifier circuit is connected to the transmitting switching circuit and the regulator circuit, respectively;

the regulator circuit is connected to the transmitting switching circuit, and the transmitting antenna is coupled with the magnetic-resonance receiving module; and the magnetic-resonance receiving module comprises a receiving Bluetooth-communication and control circuit, a receiving antenna, a receiving switching circuit and a rectifier and regulator circuit; wherein, the receiving antenna, the receiving switching circuit and the rectifier and regulator circuit are connected to the receiving Bluetooth-communication and control circuit, respectively; the rectifier and regulator circuit is connected to the receiving switching circuit, and the receiving antenna is coupled with the transmitting antenna.

2. The self-adaptive matching system according to claim 1, wherein the transmitting Bluetooth-communication and control circuit comprises a Bluetooth chip N14, a regulator chip N13 and a regulator chip N12; wherein, a pin DVDD2 of the Bluetooth chip N14 is connected to a pin DVDD1 of the Bluetooth chip N14, a 3.3V power source, a grounded capacitor C196 and a grounded capacitor C195, respectively;

a first pin GND of the Bluetooth chip N14 is grounded;

a pin NC of the Bluetooth chip N14 is connected to the 3.3V power source;

a pin P1_0 of the Bluetooth chip N14 is connected to the transmitting switching circuit;

a pin P1_1 of the Bluetooth chip N14 is connected to a cathode of a light emitting diode LED6, and an anode of the light emitting diode LED6 is connected to a first end of a resistor R79; a second end of the resistor R79 is connected to a first end of a resistor R78 and the 3.3V power source, respectively; a second end of the resistor R78 is connected to an anode of a light emitting diode LED5, and a cathode of the light emitting diode LED5 is connected to a pin P1_2 of the Bluetooth chip N14;

a pin P1_3 of the Bluetooth chip N14 is connected to the regulator circuit;

a pin P1_7 of the Bluetooth chip N14 is connected to the transmitting switching circuit;

a pin P0_6 of the Bluetooth chip N14 is connected to a first end of a resistor R77, and a second end of the resistor R77 is connected to the regulator circuit;

a pin P0_7 of the Bluetooth chip N14 is connected to a first end of a resistor R75; a second end of the resistor R75 is connected to a first end of a capacitor C189, a first end of a resistor R74 and a first end of a resistor R73, respectively; a second end of the capacitor C189 is connected to a second end of the resistor R74, and the second end of the capacitor C189 and the second end of the resistor R74 are grounded; a second end of the resistor R73 is connected to the regulator circuit;

a pin AVDD5 of the Bluetooth chip N14 is connected to the 3.3V power source and a grounded capacitor C183, respectively;

a pin AVDD3 of the Bluetooth chip N14 is connected to a grounded capacitor C184, the 3.3V power source, a pin AVDD2 of the Bluetooth chip N14, a pin AVDD1 of the Bluetooth chip N14, a pin AVDD4 of the Bluetooth chip N14, a grounded capacitor C182, a grounded capacitor C181, a grounded capacitor C180, a pin AVDD6 of the Bluetooth chip N14, a first end of a capacitor C185, a first end of a capacitor C179 and a first end of an inductor L8, respectively;

a second end of the capacitor C185 is connected to a second end of the capacitor C179, and the second end of the capacitor C185 and the second end of the capacitor C179 are grounded; a second end of the inductor L8 is connected to a power source VCC, a first end of a capacitor C178, a first end of a capacitor C177 and a pin Vout of the regulator chip N13, respectively;

a second end of the capacitor C178 is connected to a second end of the capacitor C177, a pin GND of the regulator chip N13, a first end of a capacitor C170 and a first end of a capacitor C169, respectively;

a second end of the capacitor C170 is connected to a pin Vin of the regulator chip N13, a second end of the capacitor C169, a first end of a capacitor C167, a pin Vout of the regulator chip N12 and the transmitting switching circuit, respectively;

a pin GND of the regulator chip N12 is connected to a first end of a capacitor C168 and a second end of the capacitor C167, respectively;

a pin Vin of the regulator chip N12 is connected to a second end of the capacitor C168 and the regulator circuit, respectively;

a pin RF_P of the Bluetooth chip N14 is connected to a first end of a capacitor C186; a second end of the capacitor C186 is connected to a first end of an inductor L9 and a first end of a capacitor C187, respectively; a second end of the inductor L9 is grounded; a second end of the capacitor C187 is connected to a first end of an inductor L10 and a first end of an inductor L11, respectively;

a second end of the inductor L11 is connected to a grounded capacitor C188 and a first end of an inductor L12, respectively;

a second end of the inductor L12 is connected to the transmitting antenna;

a pin RF_N of the Bluetooth chip N14 is connected to a first end of a capacitor C190; a second end of the capacitor C190 is connected to a grounded capacitor C191 and a second end of the inductor L10, respectively;

a pin XOSC_Q1 of the Bluetooth chip N14 is connected to a grounded capacitor C192 and a first end of a crystal oscillator Y2, respectively; a second end of the crystal oscillator Y2 is connected to a pin XOSC_Q2 of the Bluetooth chip N14 and a grounded capacitor C193, respectively;

a pin DCOUPL of the Bluetooth chip N14 is connected to a grounded capacitor C194; a pin R_BIAS of the Bluetooth chip N14 is connected to a grounded resistor R76, and a second pin GND of the Bluetooth chip N14 is grounded.

3. The self-adaptive matching system according to claim 2, wherein the transmitting switching circuit comprises a transmitting matching sub-circuit and a transmitting switch array sub-circuit; wherein, the transmitting switch array sub-circuit comprises a relay Y4, a relay Y5 and a relay Y6; wherein, a $5^{th}$ pin and a $4^{th}$ pin of the relay Y4 are connected to the transmitting matching sub-circuit, respectively;

a $6^{th}$ pin of the relay Y4 is connected to the radio-frequency power amplifier circuit;

an $8^{th}$ pin of the relay Y4 is connected to a cathode of a diode D4 and a collector of a triode Q6; an emitter of the triode Q6 is connected to an anode of the diode D4, a first end of a resistor R32 and a first end of a capacitor C66, respectively, and the emitter of the triode Q6, the anode of the diode D4, the first end of the resistor R32 and the first end of the capacitor C66 are grounded; a base of the triode Q6 is connected to a second end of the resistor R32, a second end of the capacitor C66 and a first end of a resistor R31, respectively; a second end of the resistor R31 is connected to the pin P1_7 of the Bluetooth chip N14;

a $1^{st}$ pin of the relay Y4 is connected to the pin Vin of the regulator chip N13;

a $3^{rd}$ pin of the relay Y4 is connected to a $3^{rd}$ pin of the relay Y6, and a $7^{th}$ pin of the relay Y4 is connected to a $6^{th}$ pin of the relay Y5;

a $4^{th}$ pin, a $5^{th}$ pin, a $7^{th}$ pin and a $2^{nd}$ pin of the relay Y5 are connected to the transmitting matching sub-circuit, respectively; a $1^{st}$ pin of the relay Y5 is connected to the pin Vin of the regulator chip N13;

a $3^{rd}$ pin of the relay Y5 is connected to a $4^{rd}$ pin of the relay Y6;

an $8^{th}$ pin of the relay Y5 is connected to a cathode of a diode D3 and a collector of a triode Q7, respectively; a base of the triode Q7 is connected to a first end of a resistor R41, a first end of a capacitor C96 and a first end of a resistor R40, respectively; a second end of the resistor R40 is connected to the pin P1_0 of the Bluetooth chip N14; an anode of the diode D3 is connected to an emitter of the triode Q7, a second end of the resistor R41 and a second end of the capacitor C96, respectively, and the anode of the diode D3, the emitter of the triode Q7, the second end of the resistor R41 and the second end of the capacitor C96 are grounded;

a $1^{st}$ pin of the relay Y6 is connected to the pin Vin of the regulator chip N13;

a $2^{nd}$ pin of the relay Y6 is connected to a collector of a triode Q9; an emitter of the triode Q9 is connected to a first end of a resistor R43 and a first end of a capacitor C97, respectively, and the emitter of the triode Q9, the first end of the resistor R43 and the first end of the capacitor C97 are grounded; a base of the triode Q9 is connected to a second end of the resistor R43, a second end of the capacitor C97 and a first end of a resistor R42, respectively; a second end of the resistor R42 is connected to the pin P1_0 of the Bluetooth chip N14; and the transmitting matching sub-circuit comprises a capacitor C56, a capacitor C57, a capacitor C58, a capacitor C59, a capacitor C60, a capacitor C61, a capacitor C62, a capacitor C63, a capacitor C64, a capacitor C65, a capacitor C98, a capacitor C92, a capacitor C93, a capacitor C94 and a capacitor C95; wherein, a first end of the capacitor C56 is connected to a first end of the capacitor C57, a first end of the capacitor C58 and the $5^{th}$ pin of the relay Y4, respectively;

a second end of the capacitor C56 is connected to a second end of the capacitor C57, a second end of the capacitor C58, a first end of the capacitor C59, a first end of the capacitor C60 and the $4^{th}$ pin of the relay Y4, respectively;

a second end of the capacitor C59 is connected to a second end of the capacitor C60 and the regulator circuit, respectively;

a first end of the capacitor C61 is connected to a first end of the capacitor C62, a first end of the capacitor C63 and the $5^{th}$ pin of the relay Y5;

a second end of the capacitor C61 is connected to a second end of the capacitor C62, a second end of the capacitor C63, a first end of the capacitor C64, a first end of the capacitor C65 and the $4^{th}$ pin of the relay Y5, respectively;

a second end of the capacitor C64 is connected to a second end of the capacitor C65 and the regulator circuit, respectively;

a first end of the capacitor C98 is connected to a first end of the capacitor C92, a first end of the capacitor C93 and the $7^{th}$ pin of the relay Y5, respectively;

a second end of the capacitor C98 is connected to a second end of the capacitor C92, a second end of the capacitor C93, a first end of the capacitor C94, the $2^{nd}$ pin of the relay Y5 and a first end of the capacitor C95, respectively; and a second end of the capacitor C95 is connected to a second end of the capacitor C94 and the regulator circuit, respectively.

4. The self-adaptive matching system according to claim 3, wherein a number of the transmitting matching sub-circuits is at least two.

5. The self-adaptive matching system according to claim 3, wherein the regulator circuit comprises a conversion chip N1, an operational amplifier chip N2, a metal oxide semiconductor (MOS) transistor Q3 and a regulator chip N3; wherein, a pin IN of the conversion chip N1 is connected to a grounded capacitor C3, a first end of a resistor R1, an anode of a polar capacitor C2 and a first end of a magnetic bead L1, respectively; a second end of the magnetic bead L1 is connected to an anode of a polar capacitor C1 and the pin Vin of the regulator chip N12, respectively;

a pin EN of the conversion chip N1 is connected to a second end of the resistor R1 and a first end of a resistor R2, respectively;

a pin AAM of the conversion chip N1 is connected to a first end of a resistor R3;

a pin VCC of the conversion chip N1 is connected to a first end of a capacitor C5; a second end of the capacitor C5 is connected to a second end of the resistor R3, a second end of the resistor R2, a cathode of the polar capacitor C2, a cathode of the polar capacitor C1, a pin GND of the conversion chip N1, a grounded resistor RS3, a first end of a resistor R8, an emitter of a triode Q4, a first end of a resistor R22, a first end of a resistor RS1 and a first end of a capacitor C20, respectively; the second end of the capacitor C5, the second end of the resistor R3, the second end of the resistor R2, the cathode of the polar capacitor C2, the cathode of the polar capacitor C1, the pin GND of the conversion chip N1, the grounded resistor RS3, the first end of the resistor R8, the emitter of the triode Q4, the first end of the resistor R22, the first end of the resistor RS1 and the first end of the capacitor C20 are grounded;

a pin FB of the conversion chip N1 is connected to a first end of a resistor R6 and a first end of a capacitor C6, respectively; a second end of the resistor R6 is connected to a second end of the resistor R8, a cathode of a diode D1 and a first end of a resistor R7, respectively; a second end of the capacitor C6 is connected to a first end of a resistor R5; a second end of the resistor R5 is connected to a second end of the resistor R7, a grounded capacitor C9, a grounded capacitor C8, a grounded capacitor C7, a first end of an inductor L2, a first end of a resistor R24 and a source of the MOS transistor Q3, respectively; a second end of the inductor L2 is connected to a pin SW of the conversion chip N1 and a first end of a capacitor C4, respectively; a second end of the capacitor C4 is connected to a first end of a resistor R4, and a second end of the resistor R4 is connected to a pin BST of the conversion chip N1; a collector of the triode Q4 is connected to a first end of a resistor R23; a second end of the resistor R23 is connected to a second end of the resistor R24 and a gate of the MOS transistor Q3, respectively; a drain of the MOS transistor Q3 is connected to the radio-frequency power amplifier circuit; a base of the triode Q4 is connected to a first end of a resistor R21 and a second end of the resistor R22, respectively; a second end of the resistor R21 is connected to the pin P1_3 of the Bluetooth chip N14;

a pin VDD of the operational amplifier chip N2 is connected to a first end of a capacitor C10, a first end of a capacitor C11 and a pin Vout of the regulator chip N3, respectively; a second end of the capacitor C10 is connected to a second end of the capacitor C11 and a first end of a resistor R15, respectively, and the second end of the capacitor C10, the second end of the capacitor C11 and the first end of the resistor R15 are grounded;

a pin OUTB of the operational amplifier chip N2 is connected to a first end of a resistor R16 and the second end of the resistor R77, respectively; a second end of the resistor R16 is connected to a second end of the resistor R15 and a pin INB− of the operational amplifier chip N2, respectively;

a pin INB+ of the operational amplifier chip N2 is connected to a first end of a resistor R17; a second end of the resistor R17 is connected to a first end of an inductor L3 and a first end of a capacitor C14, respectively; a second end of the inductor L3 is connected to a first end of a capacitor C13, a first end of a capacitor C12, a first end of a capacitor C15, a first end of a capacitor C16, a first end of an resistor L4, a second end of the resistor RS1, a first end of a resistor RS2 and a second end of the capacitor C20, respectively; a second end of the resistor RS2 is connected to the radio-frequency power amplifier circuit; a second end of the capacitor C12 is connected to a second end of the capacitor C13 and a second end of the capacitor C14, respectively, and the second end of the capacitor C12, the second end of the capacitor C13 and the second end of the capacitor C14 are grounded;

a pin VSS of the operational amplifier chip N2 is grounded;

a pin INA+ of the operational amplifier chip N2 is connected to a first end of a resistor R18; a second end of the resistor R18 is connected to a first end of a capacitor C17 and a second end of the resistor L4, respectively; a second end of the capacitor C17 is connected to a second end of the capacitor C16 and a second end of the capacitor C15, respectively;

a pin INA− of the operational amplifier chip N2 is connected to a first end of a resistor R19 and a grounded resistor R20, respectively; a second end of the resistor R19 is connected to a pin OUTA of the operational amplifier chip N2 and an anode of the diode D1, respectively; and the pin Vout of the regulator chip N3 is connected to a first end of a capacitor C23 and a first end of a capacitor C24, respectively; a second end of the capacitor C23 is connected to a second end of the capacitor C24, a pin GND of the regulator chip N3, a first end of a capacitor C22 and a first end of a capacitor C21, respectively; a second end of the capacitor C22 is connected to a second end of the capacitor C21, a pin Vin of the regulator chip N3 and the second end of the resistor R73, respectively.

6. The self-adaptive matching system according to claim 5, wherein the radio-frequency power amplifier circuit comprises an integrated regulator chip N4, a power amplifier tube N5, a drain bias sub-circuit, an output matching sub-circuit and a gate bias sub-circuit; wherein, a pin Vin of the integrated regulator chip N4 is connected to a first end of a capacitor C33, the drain of the MOS transistor Q3, a first end of a capacitor C25 and the drain bias sub-circuit, respectively; a second end of the capacitor C25 is connected to the second end of the resistor RS2 and the gate bias sub-circuit, respectively;

a pin GND of the integrated regulator chip N4 is connected to the second end of the resistor RS2, a second end of the capacitor C33 and a first end of a capacitor C34, respectively; a second end of the capacitor C34 is connected to a pin Vout of the integrated regulator chip N4, the gate bias sub-circuit and a first end of an inductor L5, respectively; a second end of the inductor L5 is connected to a first end of a capacitor C35, a first end of a capacitor C36 and a $4^{th}$ pin of a crystal oscillator Y1, respectively; a second end of the capacitor C35 is connected to the second end of the resistor RS2 and a second end of the capacitor C36, respectively; a $2^{nd}$ pin of the crystal oscillator Y1 is connected to the second end of the resistor RS2; a $3^{rd}$ pin of the crystal oscillator Y1 is connected to a first end of a capacitor C37 and a first end of a capacitor C38, respectively; a second end of the capacitor C37 is connected to a second end of the capacitor C38 and the gate bias sub-circuit, respectively;

the drain bias sub-circuit comprises a polar capacitor C26, a capacitor C27, a capacitor C28, a capacitor C29, an inductor L6, a capacitor C30, a capacitor C31 and a capacitor C32; wherein, an anode of the polar capacitor C26 is connected to the pin Vin of the integrated regulator chip N4, a first end of the capacitor C27, a first end of the capacitor C28, a first end of the capacitor C29 and a first end of the inductor L6, respectively;

a cathode of the polar capacitor C26 is connected to a second end of the capacitor C27, a second end of the capacitor C28, a second end of the capacitor C29 and the second end of the resistor RS2, respectively;

a second end of the inductor L6 is connected to a first end of the capacitor C30, a first end of the capacitor C31, a first end of the capacitor C32, a drain of the power amplifier tube N5 and the output matching sub-circuit, respectively;

a second end of the capacitor C30 is connected to the second end of the resistor RS2, a second end of the capacitor C31 and a second end of the capacitor C32, respectively;

the gate bias sub-circuit comprises a capacitor C39, a resistor R25, a resistor R26, a resistor R27, a resistor R28 and a capacitor C40; wherein, a first end of the capacitor C39 is connected to the pin Vout of the integrated regulator chip N4 and a first end of the resistor R25, respectively;

a second end of the resistor R25 is connected to a first end of the resistor R26;

a second end of the resistor R26 is connected to a first end of the capacitor C40, a first end of the resistor R27 and a first end of the resistor R28, respectively;

a second end of the capacitor C40 is connected to a second end of the capacitor C39, a second end of the resistor R27, a source of the power amplifier tube N5, the output matching sub-circuit and the second end of the capacitor C25, respectively;

a second end of the resistor R28 is connected to the second end of the capacitor C37 and a gate of the power amplifier tube N5, respectively; and the output matching sub-circuit comprises a capacitor C41, a capacitor C42, a capacitor C43, a capacitor C44, an inductor L7, a capacitor C45, a capacitor C46, a capacitor C47 and a capacitor C48; wherein, a first end of the capacitor C41 is connected to the drain of the power amplifier tube N5, a first end of the capacitor C42 and the second end of the inductor L6, respectively;

a second end of the capacitor C41 is connected to a second end of the capacitor C42, a first end of the inductor L7, a first end of the capacitor C43 and a first end of the capacitor C44, respectively;

a second end of the inductor L7 is connected to a second end of the capacitor C43, a second end of the capacitor C44, a first end of the capacitor C45, a first end of the capacitor C46, a first end of the capacitor C47 and a first end of the capacitor C48, respectively;

a second end of the capacitor C48 is connected to the $6^{th}$ pin of the relay Y4; a second end of the capacitor C45 is connected to a second end of the capacitor C46, a second end of the capacitor C47 and the source of the power amplifier tube N5, respectively.

7. The self-adaptive matching system according to claim 1, wherein the receiving Bluetooth-communication and control circuit comprises a Bluetooth chip N15 and a regulator chip N11; wherein, a pin DVDD2 of the Bluetooth chip N15 is connected to a grounded capacitor C155, a grounded capacitor C156, a pin DVDD1 of the Bluetooth chip N15, a 3.3BV power source, a pin AVDD5 of the Bluetooth chip N15, a grounded capacitor C154, a grounded capacitor C153, a pin AVDD3 of the Bluetooth chip N15, a grounded capacitor C151, a grounded capacitor C152, a pin AVDD2 of the Bluetooth chip N15, a pin AVDD1 of the Bluetooth chip N15, a pin AVDD4 of the Bluetooth chip N15, a pin AVDD6 of the Bluetooth chip N15, a grounded capacitor C150, a grounded capacitor C149 and a first end of an inductor L18, respectively; a second end of the inductor L18 is connected to the power source VCC, a first end of a capacitor C148, a first end of a capacitor C147 and a pin Vout of the regulator chip N11, respectively;

a pin Vin of the regulator chip N11 is connected to a 5V power source and a first end of a capacitor C146, respectively; a second end of the capacitor C146 is connected to a second end of the capacitor C147, a second end of the capacitor C148 and a pin GND of the regulator chip N11, respectively, and the second end of the capacitor C146, the second end of the capacitor C147, the second end of the capacitor C148 and the pin GND of the regulator chip N11 are grounded;

a first pin GND of the Bluetooth chip N15 is grounded;

a pin NC of the Bluetooth chip N15 is connected to the 3.3BV power source;

a pin P1_0 of the Bluetooth chip N15 is connected to a first end of a resistor R53; a second end of the resistor R53 is connected to a first end of a resistor R54, a first end of a capacitor C114 and a base of a triode Q8, respectively; an emitter of the triode Q8 is connected to a second end of the resistor R54, a second end of the capacitor C114 and an anode of a diode D5, respectively, and the emitter of the triode Q8, the second end of the resistor R54, the second end of the capacitor C114 and the anode of the diode D5 are grounded; a cathode of the diode D5 is connected to a collector of the triode Q8 and the receiving switching circuit, respectively;

a pin P1_1 of the Bluetooth chip N15 is connected to the receiving switching circuit;

a pin P1_3 of the Bluetooth chip N15 is connected to a first end of a resistor R68, and a second end of the resistor R68 is connected to an anode of a light emitting diode LED3;

a pin P1_4 pin of the Bluetooth chip N15 is connected to a first end of a resistor R69, and a second end of the resistor R69 is connected to an anode of a light emitting diode LED4; a cathode of the light emitting diode LED4 is connected to a cathode of the light emitting diode LED3, and the cathode of the light emitting diode LED4 and the cathode of the light emitting diode LED3 are grounded;

a pin P0_0 of the Bluetooth chip N15 is connected to a grounded capacitor C166, a grounded capacitor C165, a grounded resistor R71 and a first end of a resistor R70, respectively; a second end of the resistor R70 is connected to a 5.8V power source;

a pin P0_3 of the Bluetooth chip N15 is connected to a first end of a resistor R67, and a second end of the resistor R67 is connected to the rectifier and regulator circuit;

a pin P0_7 of the Bluetooth chip N15 is connected to the rectifier and regulator circuit;

a pin RESET_N of the Bluetooth chip N15 is connected to a first end of a resistor R66, and a second end of the resistor R66 is connected to the 3.3BV power source;

a second pin GND of the Bluetooth chip N15 is grounded;

a pin R_BIAS of the Bluetooth chip N15 is connected to a grounded resistor R65;

a pin DCOUPL of the Bluetooth chip N15 is connected to a grounded capacitor C164;

a pin XOSC_Q2 of the Bluetooth chip N15 is connected to a grounded capacitor C163 and a $1^{st}$ pin of a crystal oscillator Y9, respectively; a $2^{nd}$ pin of the crystal oscillator Y9 is connected to a $4^{th}$ pin of the crystal oscillator Y9, and the $2^{nd}$ pin of the crystal oscillator Y9 and the $4^{th}$ pin of the crystal oscillator Y9 are grounded; a $3^{rd}$ pin of the crystal oscillator Y9 is connected to a grounded capacitor C162 and a pin XOSC_Q1 of the Bluetooth chip N15, respectively;

a pin RF_N of the Bluetooth chip N15 is connected to a first end of a capacitor C160; a second end of the capacitor C160 is connected to a first end of an inductor L15 and a grounded capacitor C161, respectively; a second end of the inductor L15 is connected to a first end of an inductor L16 and a first end of a capacitor C158, respectively; a second end of the capacitor C158 is connected to a first end of a capacitor C157 and a first end of an inductor L14, respectively; a second end of the inductor L14 is grounded; a second end of the capacitor C157 is connected to a pin RF_P of the Bluetooth chip N15; a second end of the inductor L16 is connected to a first end of an inductor L17 and a first end of a grounded capacitor C159, respectively; a second end of the inductor L17 is connected to the receiving antenna.

8. The self-adaptive matching system according to claim 7, wherein the receiving switching circuit comprises a receiving switch array sub-circuit and a receiving matching sub-circuit; wherein, the receiving switch array sub-circuit comprises a relay Y7 and a relay Y8; wherein, a $1^{st}$ pin of the relay Y7 is connected to a 12BV power source;

a $2^{nd}$ pin of the relay Y7 is connected to a grounded capacitor C110, a grounded capacitor C109, a first end of a capacitor C107 and a first end of a capacitor C108, respectively; a second end of the capacitor C107 is connected to a second end of the capacitor C108 and a $7^{th}$ pin of the relay Y7, respectively;

a $3^{rd}$ pin of the relay Y7 is connected to one end of the receiving antenna and a $6^{th}$ pin of the relay Y8, respectively;

a $4^{th}$ pin and a $5^{th}$ pin of the relay Y7 are connected to the receiving matching sub-circuit, respectively;

a $6^{th}$ pin of the relay Y7 is connected to a $2^{nd}$ pin of the relay Y8;

an $8^{th}$ pin of the relay Y7 is connected to the collector of the triode Q8;

a $5^{th}$ pin and a $4^{th}$ pin of the relay Y8 are connected to the receiving matching sub-circuit, respectively;

a $3^{rd}$ pin of the relay Y8 is connected to the rectifier and regulator circuit;

an $8^{th}$ pin of the relay Y8 is connected to the 12BV power source;

a $1^{st}$ pin of the relay Y8 is connected to a collector of a triode Q9 and a cathode of a diode D6, respectively; a base of the triode Q9 is connected to a first end of a resistor R52, a first end of a capacitor C113 and a first end of a resistor R51, respectively; a second end of the resistor R51 is connected to the pin P1_1 of the Bluetooth chip N15; a second end of the capacitor C113 is connected to a second end of the resistor R52, an emitter of the triode Q9 and an anode of the diode D6, respectively, and the second end of the capacitor C113, the second end of the resistor R52, the emitter of the triode Q9 and the anode of the diode D6 are grounded; and the receiving matching sub-circuit comprises a grounded capacitor C102, a grounded capacitor C101, a capacitor C99, a capacitor C100, a grounded capacitor C105, a grounded capacitor C106, a capacitor C103 and a capacitor C104; wherein, a first end of the capacitor C99 is connected to a first end of the capacitor C100, the grounded capacitor C101, the grounded capacitor C102 and the $5^{th}$ pin of the relay Y8, respectively; a second end of the capacitor C99 is connected to a second end of the capacitor C100 and the $4^{th}$ pin of the relay Y8, respectively; a first end of the capacitor C103 is connected to the grounded capacitor C105, the grounded capacitor C106, a first end of the capacitor C104 and the $4^{th}$ pin of the relay Y7, respectively; a second end of the capacitor C103 is connected to a second end of the capacitor C104 and the $5^{th}$ pin of the relay Y7, respectively.

9. The self-adaptive matching system according to claim 8, wherein a number of the receiving matching sub-circuits is at least two.

10. The self-adaptive matching system according to claim 8, wherein the rectifier and regulator circuit comprises a rectifier sub-circuit, a filter sub-circuit and a regulator sub-circuit; wherein, the rectifier sub-circuit comprises a capacitor C112, a capacitor C111, a diode D7, a diode D8, a diode D9 and a diode D10; wherein,
- a first end of the capacitor C112 is connected to a cathode of the diode D7, a cathode of the diode D8, a first end of the capacitor C111 and the filter sub-circuit, respectively; a second end of the capacitor C112 is connected to a second end of the capacitor C111, an anode of the diode D9, an anode of the diode D10 and the regulator sub-circuit, respectively; an anode of the diode D7 is connected to a cathode of the diode D9 and the 3$^{rd}$ pin of the relay Y8, respectively; an anode of the diode D8 is connected to a cathode of the diode D10, and the anode of the diode D8 and the cathode of the diode D10 are grounded;

the filter sub-circuit comprises a grounded capacitor C118, a grounded capacitor C119, a grounded capacitor C120, a grounded capacitor C121, a grounded capacitor C122, a grounded capacitor C123, a grounded capacitor C124, a grounded capacitor C125, a grounded capacitor C126, a grounded capacitor C127 and a grounded capacitor C128; wherein,
- the grounded capacitor C118 is connected to the first end of the capacitor C112, the grounded capacitor C119, the grounded capacitor C120, the grounded capacitor C121, the grounded capacitor C122, the grounded capacitor C123, the grounded capacitor C124, the grounded capacitor C125, the grounded capacitor C126, the grounded capacitor C127, the grounded capacitor C128, the second end of the resistor R67 and the regulator sub-circuit, respectively; and the regulator sub-circuit comprises a power conversion chip N8 and a triode N12; wherein,
- a pin Vin of the power conversion chip N8 is connected to the grounded capacitor C118;
- a pin COMP of the power conversion chip N8 is connected to a first end of a resistor R55 and a first end of a capacitor C134, respectively; a second end of the resistor R55 is connected to a first end of a capacitor C133; a second end of the capacitor C133 is connected to the second end of the capacitor C112, a second end of the capacitor C134, a first end of a resistor R56, a pin GND of the power conversion chip N8, a first end of a resistor R58 and a first end of a resistor RS4, respectively; a second end of the resistor RS4 is connected to an interface J4 of a rectifier and regulator output voltage end; a second end of the resistor R56 is connected to a pin RT/CLK of the power conversion chip N8;
- a pin FB of the power conversion chip N8 is connected to a second end of the resistor R58 and a first end of a resistor R57, respectively; a second end of the resistor R57 is connected to a grounded capacitor C136, a grounded capacitor C137, a first end of an inductor L13, a first end of a resistor R49 and a source of an MOS transistor N9, respectively; a second end of the resistor R49 is connected to a collector of the triode N12 and a gate of the MOS transistor N9, respectively; a drain of the MOS transistor N9 is connected to the 5.8V power source, an interface J3 of the rectifier and regulator output voltage end and a first end of a capacitor C138, respectively; a second end of the capacitor C138 is connected to an emitter of the triode N12, and the second end of the capacitor C138 and the emitter of the triode N12 are grounded; a base of the triode N12 is connected to a first end of a resistor R50, and a second end of the resistor R50 is connected to the pin P0_7 of the Bluetooth chip N15; a second end of the inductor L13 is connected to a cathode of a diode D11, a first end of a capacitor C135 and a pin SW of the power conversion chip N8, respectively; an anode of the diode D11 is grounded, and a second end of the capacitor C135 is connected to a pin BOOT of the power conversion chip N8.

* * * * *